(12) United States Patent
Cantini et al.

(10) Patent No.: US 7,231,371 B1
(45) Date of Patent: Jun. 12, 2007

(54) METHOD AND SYSTEM FOR ORDERING AND DELIVERING DIGITAL CERTIFICATES

(75) Inventors: Renato Cantini, Belfaux (CH); Peter Keller, Villars-sur-Glâne (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 10/129,949

(22) PCT Filed: Nov. 19, 1999

(86) PCT No.: PCT/CH99/00554

§ 371 (c)(1),
(2), (4) Date: May 17, 2002

(87) PCT Pub. No.: WO01/39143

PCT Pub. Date: May 31, 2001

(51) Int. Cl.
*H04L 9/00* (2006.01)
(52) U.S. Cl. ......................................... 705/65; 713/155
(58) Field of Classification Search ................. 705/50, 705/64–67, 71–75; 713/155–186, 200–202; 380/277–285, 28–30, 44
See application file for complete search history.

(56) References Cited

U.S. PATENT DOCUMENTS

| | | | |
|---|---|---|---|
| 5,475,758 A | 12/1995 | Kikuchi ...................... 713/156 |
| 5,615,268 A | 3/1997 | Bisbee et al. ................ 713/176 |
| 5,982,898 A | 11/1999 | Hsu et al. .................... 713/156 |
| 6,615,171 B1* | 9/2003 | Kanevsky et al. .......... 704/246 |
| 6,715,073 B1* | 3/2004 | An et al. ..................... 713/156 |
| 6,886,095 B1* | 4/2005 | Hind et al. .................. 713/168 |
| 2002/0004900 A1* | 1/2002 | Patel ........................... 713/155 |

FOREIGN PATENT DOCUMENTS

| | | |
|---|---|---|
| JP | 09319798 A * | 12/1997 |
| WO | 98 26386 | 6/1998 |

OTHER PUBLICATIONS

Mendel, "Sorting Out Security", InforWorld, v21n32, pp. 32-33, Aug. 9, 1999, ISSN: 0199-6649.*

* cited by examiner

*Primary Examiner*—Mary D. Cheung
(74) *Attorney, Agent, or Firm*—Oblon, Spivak, McClelland, Maier & Neustadt, P.C.

(57) ABSTRACT

Method and system for ordering a digital certificate by a user and for delivering the certificate to a certificate support device of the user. A placed order, in which personal data have been received from the user and the user has been authenticated by a registration unit, is stored in a responsible certification unit. A secret certificate PIN assigned to the order, which is otherwise known only to the certification unit, is transmitted to the user, and a certificate or a reference to a certificate is transmitted for storing to the certificate support device identified by a certificate support identification, if the certificate PIN and indications making it possible to determine the order are transmitted to the certification unit.

10 Claims, 2 Drawing Sheets

METHOD AND SYSTEM FOR ORDERING AND DELIVERING DIGITAL CERTIFICATES

BACKGROUND OF THE INVENTION

This invention relates to a method and a system for ordering and delivering digital certificates. The present invention relates in particular to a method and a system for ordering digital certificates by users and for delivering digital certificates to certificate support devices of these users.

With the progressive spread and growing popularity of digital communication networks, be it fixed networks, in particular the worldwide Internet, or terrestrial or satellite-based mobile radio networks, it has become more and more necessary for the user to use cryptographic methods in the transmission of digital data over these communication networks, in particular in connection with electronic transactions of any kind, in order to ensure the confidentiality and integrity of the transmitted data and the authenticity of the sender of these data. A well-known cryptographic method is asymmetrical cryptography in which a digital key pair, consisting of a private key and a public key, is used by a user for encryption and decryption of data as well as for generation and checking of digital signatures. To transmit data over the communication networks under a certified identity, the digital public key is certified by a certification authority by means of known cryptographic algorithms after the identity of the respective user has been determined and authenticated by a registration authority. For critical uses, for instance financial transactions and/or transmission of data that trigger events of great importance, it can be necessary for a user to appear in person at the registration point at least when registering for the first time, handwritten documents of the user often being registered as well. The resultant digital public key certificate, or designated in short as certificate in the following description, and the associated key pair are stored in a certificate support device, often referred to as token, for example a mobile device, for instance a mobile radio telephone, a personal computer, a portable computer or a chipcard, e.g. a SIM card (subscriber identity module), or another suitable device with data store and communications interface.

For better understanding, it should be stated here that the functions and the services of a certification authority, or respectively of a registration authority, are executed by units that will be referred to as the certification unit or respectively the registration unit in the following text.

SUMMARY OF THE INVENTION

Described in the patent publication U.S. Pat. No. 5,982,898 is a certification method for secured and authenticated communication over the Internet. According to U.S. Pat. No. 5,982,898, the identity of a user is checked by a registration unit with reference to information and evidence of the user, and if the identity is secured, a password is thereafter given to the user, which is also transmitted to a certification unit from the registration unit. According to U.S. Pat. No. 5,982,898, whenever the user needs a certificate, he contacts the certification unit and identifies himself with the said password. If the certification unit recognizes the password as valid, it generates a certificate and transmits it to the user via a secure channel, according to U.S. Pat. No. 5,982,898.

It is an object of this invention to propose a new method and a new system for ordering and delivering digital certificates which can be used in particular in heterogeneous environments having different technical infrastructure, various communication networks and certificate support devices.

This object is achieved according to the invention in particular through the features of the independent claims. Further advantageous embodiments follow moreover from the dependent claims and from the description.

In particular, these objects are achieved through the invention in that an order for a digital certificate placed by a user, for instance a private individual, an organization, a unit of an organization or an employee of an organization, is stored, for example in that a certificate order number assigned to the order is stored in a responsible certification unit, for instance a computer with corresponding, programmed software modules, and a secret certificate PIN (Personal Identification Number), assigned to the order, is generated, for example by means of a suitable software module, the secret certificate PIN, which is otherwise known only to the certification unit, is transmitted to the user, for instance in encrypted form, via a communication network or on paper, in an envelope in a way not visible from outside, and a certificate or a reference to a certificate is transmitted to the certificate support device of the respective user and is stored there if the certificate PIN and indications making it possible to determine the order are transmitted to the certification unit. The certificate support device is thereby e.g. a personal computer, a portable computer, a mobile radio device, in particular a mobile radio telephone, or a chipcard, in particular a SIM card (Subscriber Identity Module) or another suitable device with data store and communications interface. Instead of a certificate PIN, a certificate password can also be used, the terms "certificate PIN" and "certificate password" being used as equivalent terms in this text. The storing of an order, or respectively of a certificate order number, and the transmission of a secret certificate PIN, assigned to this order or respectively to this certificate order number, to the respective user has the advantage that the transmission of the certificate, or respectively of a reference to the certificate, to the certificate support device of the respective user can be separated both with respect to time and place from the actual order by the respective user, without the security being thereby limited, whereby the method for ordering and delivering certificates is able to be adapted flexibly to differing requirements and conditions of the available technical infrastructure. In particular, if the certificate support device does not include any user-friendly user interface, if it has a small display on which only little information can be reproduced or if it has a limited keyboard comprising only a subset of the keys of conventional computer keyboards, or if it comprises a user interface that entails for the user long periods of response for input commands and character display, another device with a suitable user interface can be used for the task of ordering a certificate, for instance a personal computer or another suitable data terminal, and the certificate support device can be used merely during delivery of the certificate.

Preferably, during ordering of a certificate, personal data of the respective user are transmitted to the certification unit, for example via a communication network and/or via software program interfaces which are executed in a computer, or on paper, whereby the user is authenticated by a registration unit and the assignment of the personal data to this respective user by the registration unit is confirmed to the certification unit, for example via a communication network and/or via software program interfaces implemented in a computer, or on paper. Through separation of the functions of the certification unit and the registration unit, a further temporal and/or local separation of the ordering task is made possible, in particular personal data capture and user identification, if this is required or desirable.

In an embodiment variant, a pair of cryptographic keys, consisting of a private key and a public key, is generated in the certificate support device, and the public key is transmitted to the certification unit, for instance over a communication network, e.g. a mobile radio network and/or a fixed network, and the certificate is generated through certification of the received public key by the certification unit. This embodiment variant has the advantage that the private key does not have to be transmitted over communication networks to the certificate support device and thus the confidentiality of the private key is able to be better ensured.

In an embodiment variant, a pair of cryptographic keys, consisting of a private key and a public key, is generated by a key generating unit outside the certificate support device, for example a suitable hardware or software module on the computer of the certification unit or on another computer, and the public key is made accessible to the certification unit, for instance over a communication network and/or via software program interfaces, the certificate is generated through certification of the public key by the certification unit, and the private key is transmitted to the certificate support device, for example over a communication network, e.g. a mobile radio network and/or a fixed network, or via a suitable, local device interface, for instance a device interface having contacts or a contactless device interface, e.g. a radio or infrared interface. The advantage of this embodiment variant consists in that the certificate support device does not need to have any means, for example hardware or software modules, for generating the pair of keys. However, for transmission of the private key to the certificate support device via a suitable device interface, the certificate support device would have to be presented locally at the key generating unit if the private key is not supposed to be transmitted to the certificate support device via a communication network, for security reasons; a transmission of the private key over a communication network, where applicable, would take place in a secured, for instance encrypted, manner.

According to the invention, a certificate support identification is transmitted to the certification unit, for example an IMSI (International Mobile Subscriber Identification), an MSISDN number (Mobile Subscriber ISDN), an unambiguous device number or another unambiguous identification, and the certificate or the reference to the certificate is transmitted to the certificate support device identified through the certificate support identification, for instance over a communication network, e.g. a mobile radio network and/or a fixed network.

It should be stated here that, besides the method according to the invention, the present invention also relates to a system for carrying out this method.

An embodiment of the present invention will be described in the following with reference to examples. The examples of the embodiment are illustrated by the following attached figures:

DETAILED DESCRIPTION OF THE INVENTION

Figure 1A:
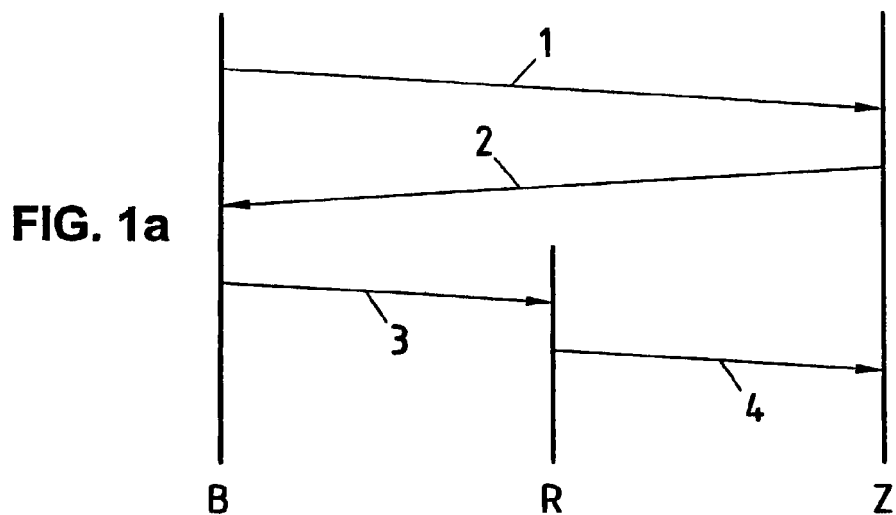
FIG. 1a shows a time-dependency diagram illustrating a first variant of the sequential course of the information flow between a user, a certification unit and a registration unit.

In FIG. 1a, the reference symbol B relates to a user, who first places an order for a certificate, as indicated symbolically by the arrow 1, and thereby transmits his personal data to the certification unit Z, where they are stored in a database, for example. The placing of the order for a certificate and the transmission of the personal data of the user B preferably takes place by means of a suitable communication terminal 78, 8, or in particular with the certificate support device 7, via a communication network 6, as will be described later with reference to FIGS. 2a to 2c. As illustrated by arrow 2 in FIG. 1, a secret certificate PIN (Personal Identification Number), assigned to this order, is then transmitted to the user B from the certification unit Z. The transmission of the secret certificate PIN preferably also takes place from the certification unit Z via a communication network 6 to a suitable communication terminal 7, 78, or in particular to the certificate support device 7 of the user B, as is described later with reference to FIGS. 2a to 2c. As indicated symbolically in FIG. 1a by the arrow 3, the user B authenticates himself with the registration unit R at a later point in time, for example by means of a personal appearance at the registration unit R with the aid of official documents, for instance an identity card or passport or another official, notarized document, or via a communication network 6 using a piece of secret information which is known only to the user B and to the registration unit R and which has been transmitted or handed over to the user B by the registration unit R following a successful authentication beforehand, for instance. During the authentication of the user B, the personal data of the user B in the certification unit Z can also be consulted by the registration unit R, for example via the communication link 5 or via the communication network 6. After that, the registration unit R confirms to the certification unit Z the authenticity of the respective user B, i.e. the registration unit R confirms to the certification unit Z the genuineness of the identity of the user B and the assignment of the personal data to the respective user B, as is indicated by the arrow 4 in FIG. 1a. The confirmation of the authenticity of the user B to the certification unit Z by the registration unit R can take place via the communication link 5 or over the communication network 6, whereby, depending upon how the certification unit Z and the registration unit R are implemented, the authenticity of the registration unit R is checked by the certification unit Z, for example on the basis of an electronic signature of the registration unit R, in particular a digital signature of the registration unit R. The confirmation of the authenticity of the user B to the certification unit Z by the registration unit R can also be confirmed by means of a contract (on paper) signed by the user B and by a representative of the registration unit R, which contract is transmitted to representatives of the certification unit Z, for instance by postal route or by means of fax.

Figure 1B:
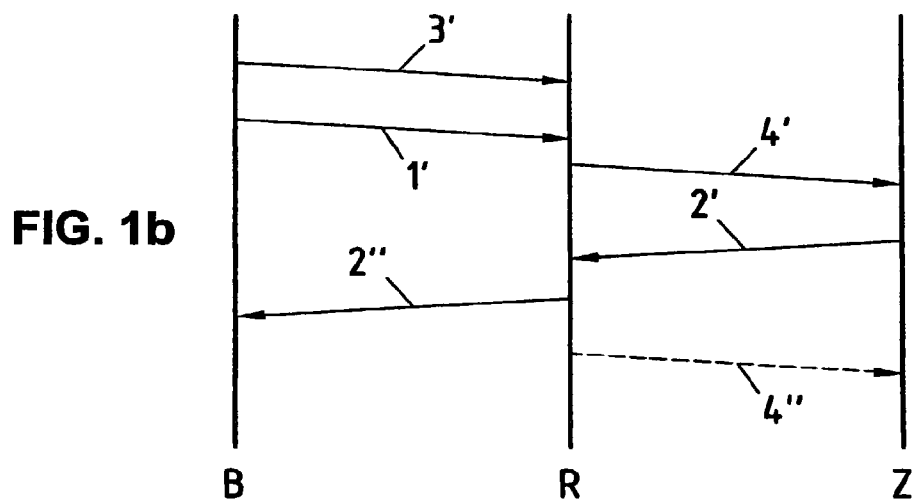
FIG. 1b shows a time-dependency diagram illustrating a second variant of the sequential course of the information flow between a user, a certification unit and a registration unit.

Shown in FIG. 1b is a further (alternative or supplementary) embodiment variant of the sequential course of the information flow between the user B, the certification unit Z and the registration unit R. According to FIG. 1b, the user B first authenticates himself, as indicated symbolically by the arrow 3', with the registration unit R, for example, as described above, through a personal appearance at the registration unit R with the aid of official documents, for instance an identity card or passport or another official, notarized document, or via a communication network 6 using a secret piece of information which is known only to the user B and to the registration unit R and which has been transmitted or handed over beforehand to the user B by the registration unit following a prior successful authentication, for example. Afterwards the user B, as indicated by the arrow 1', places an order for a certificate and thereby gives his personal data to the registration unit R. As is indicated by the arrow 4' in FIG. 1b, the registration unit R then sends the personal data of the user B to the certification unit Z, for example via the communication link 5 or over the communication network 6, where they are stored in a database, for instance. During the transmission of the personal data to the certification unit Z, the authenticity of the user B, i.e. the genuineness of the identity of the user B and the assignment of the personal data to the respective user B, can also be confirmed to the certification unit Z at the same time; depending upon how the certification unit Z and the registration unit R are implemented, the authenticity of the registration unit R is thereby checked by the certification unit Z, for example on the basis of an electronic signature of the registration unit R, in particular a digital signature of the registration unit R. As is illustrated by the arrow 2' in FIG. 1b, a secret certificate PIN (Personal Identification Number) assigned to the placed order is then transmitted by the certification unit Z to the registration unit R, for example via the communication link 5 or over the communication network 6. As indicated by the arrow 2" in FIG. 1b, the registration unit R forwards the certificate PIN to the user B, for instance on a display in a way visible only to the user B, or through printing on a record, concealed by an envelope, or on a data support of the user B, via a suitable writing device, for example on the certificate support device 7. If the authenticity of the user B has not been confirmed already to the certification unit Z via the communication link 5 or over the communication network 6, the confirmation of the authenticity of the user B to the certification unit Z by the registration unit R, as shown by the arrow of broken lines 4" in FIG. 1b, can be confirmed by means of a contract (on paper) signed by the user B and by a representative of the registration unit R, which contract is transmitted, for example by postal route or by means of fax, to representatives of the certification unit Z.

Figure 1C:
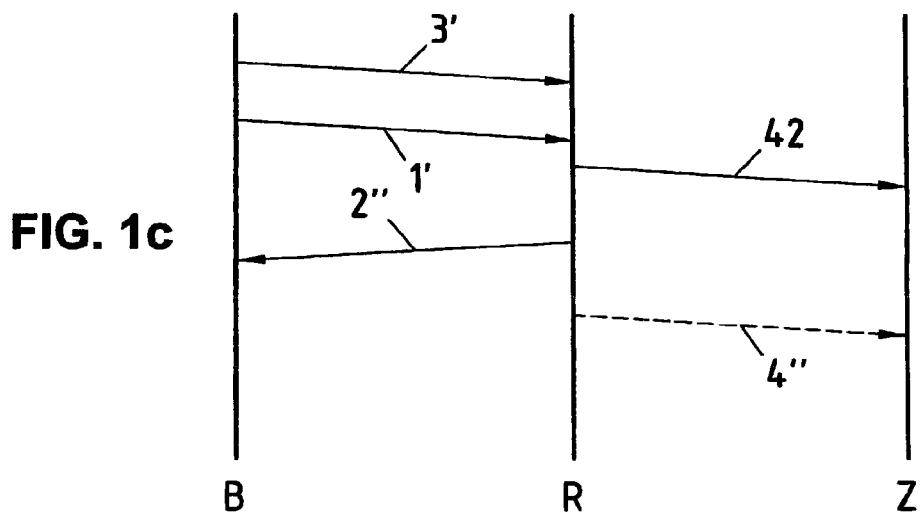
FIG. 1c shows a time-dependency diagram illustrating a third variant of the sequential course of the information flow between a user, a certification unit and a registration unit.

Shown in FIG. 1c is a further (alternative or supplementary) embodiment variant of the sequential course of the information flow between the user B, the certification unit Z and the registration unit R, which differs from the variant according to FIG. 1b in that the certificate PIN is generated in the registration unit R. According to FIG. 1c, the user B first authenticates himself, as indicated symbolically by the arrow 3', with the registration unit R, for example, as described above, through a personal appearance at the registration unit R with the aid of official documents, for instance an identity card or passport or another official, notarized document, or via a communication network 6 using a secret piece of information which is known only to the user B and to the registration unit R and which has been transmitted or handed over to the user B by the registration unit following a prior successful authentication, for example. Afterwards the user B, as indicated by the arrow 1', places an order for a certificate and thereby gives his personal data to the registration unit R. In contrast to the preceding embodiment variants according to FIGS. 1a and 1b, after authentication of the user B, a secret certificate PIN (Personal Identity Number), assigned to the placed order, is generated in the registration unit R. As shown by the arrow 42 in FIG. 1c, the registration unit R then sends the personal data of the user B as well as the generated secret certificate PIN to the certification unit Z, for example via the communication link 5 or over the communication network 6, where they are stored in a database, for example. During the transmission of the personal data to the certification unit Z, the authenticity of the user, i.e. the genuineness of the identity of the user B and the assignment of the personal data to the respective user B, can also be confirmed to the certification unit Z at the same time; depending upon how the certification unit Z and the registration unit R are implemented, the authenticity of the registration unit R is thereby checked by the certification unit Z, for example on the basis of an electronic signature of the registration unit R, in particular a digital signature of the registration unit R. As indicated by the arrow 2" in FIG. 1c, the registration unit R forwards the secret certificate PIN also to the user B, for instance on a display in a way visible only to the user B, or through printing on a record, concealed by an envelope, or on a data support of the user B via a suitable writing device, for example on the certificate support device 7. If the authenticity of the user B has not been confirmed already to the certification unit Z via the communication link 5 or over the communication network 6, the confirmation of the authenticity of the user B to the certification unit Z by the registration unit R, as shown by the arrow of broken lines 4" in FIG. 1c, can be confirmed by means of a contract (on paper) signed by the user B and by a representative of the registration unit R, which contract is transmitted to the representatives of the certification unit Z, for example by postal route or by means of fax.

The above-mentioned personal data of a user B comprise, for example, data such as first name, surname, maiden name of the mother, date of birth, address, profession as well as identification numbers such as, for instance, passport, insurance policy or customer number(s) of the user B.

After the certification unit Z has received from the registration unit R a confirmation of the authenticity of the user B, the authenticity of the user B is considered ensured for the certification unit Z so that a later delivery of the ordered certificate to the user B, or respectively to a certificate support device of the user B, can be undertaken if the user B authenticates himself using the secret certificate PIN. To obtain the ordered certificate, a certificate support identification is transmitted to the certification unit Z, as will be described later with reference to FIGS. 2a to 2c, which certificate support identification identifies the certificate support device 7 onto which the ordered certificate or a reference to this certificate is supposed to be transmitted. To obtain the ordered certificate, sufficient data must be transmitted to the certification unit Z to make it possible for the certification unit Z to determine the respective certificate order, i.e. the respective certificate order number. Depending upon the embodiment, the certificate PIN can be an unambiguous number, for example, or an unambiguous password, which make it possible to determine the assigned order, or personal data of the respective user B are transmitted to the certification unit Z, which make it possible to determine the respective order, or the order number is transmitted beforehand, upon ordering, to the user B so that this order number can be transmitted to the certification unit Z when obtaining the ordered certificate.

Various possible configurations of the certification unit Z, the registration unit R and the certificate support device 7 will be described in the following paragraphs with reference to FIGS. 2a to 2c.

The registration unit R is in a place accessible to the public, for example, where users B who would like to have themselves registered, are assisted with the registration, for instance by representatives of the registration unit R, i.e. employed personnel of the registration unit R. The registration unit R comprises all hardware and software components to carry out the functions of the registration unit R described above, in particular to carry out the functions of the registration unit R described with reference to FIGS. 1a and/or 1b and/or 1c. The registration unit R comprises, or has access to, a programmed software application which is executed on one or more computers, for example on a central computer with linked data input/output terminals or in a networked client/server environment with a plurality of computers. The programmed software application comprises, for example, software modules to consult personal data of a user B stored in the certification unit Z in order to confirm to the certification unit Z the authenticity of a user B, to confirm to the certification unit Z the authenticity of the registration unit R, e.g. on the basis of an electronic signature, and/or to receive, capture and forward to the certification unit Z an order for a certificate as well as personal data from a user B, and/or to receive a certificate PIN from the certification unit Z and to forward it to the user B, and/or to generate a secret certificate PIN and to forward it in a secure way to the certification unit Z and to the user B. In particular, for the forwarding of the certificate PIN to the user B, the registration unit R comprises, for example, suitable supplementary hardware components, in particular output devices suitable therefor, such as, for instance, display devices, writing devices or printers. The registration unit R comprises moreover corresponding hardware and software components for communicating via the communication network 6 and/or the communication link 5.

The certification unit Z comprises all hardware and software components to carry out the above-described functions of the certification unit Z, in particular to carry out the functions of the certification unit Z described with reference to FIGS. 1a and/or 1b and/or 1c. The certification unit Z has access to or comprises, for instance, a programmed software application which is executed on one or more computers. The programmed software application of the certification unit Z comprises, for example, software modules to receive and capture orders for certificates and personal data from a user B and/or from the registration unit R for a user B, to generate and store for a received order an assigned certificate order number, to generate and store for a received and registered order a certificate PIN and/or to receive from the registration unit, preferably in a secure way, and store a secret certificate PIN, generated by the registration unit R, and/or to transmit to the respective user and/or to the registration unit R, in a secure way, and/or preferably encrypted, a generated certificate PIN, to make accessible to the registration unit R captured personal data of a user B, to receive from the registration unit R and store a confirmation of the authenticity of a user B and to check the authenticity of the registration unit R, for instance on the basis of an electronic signature. The certification unit Z further comprises hardware and software components for communicating via the communication network 6 and/or the communication link 5.

The certification unit Z has moreover software modules to receive from the user B, or respectively from the communication terminal 7, 78 used by the user or from the certificate support device 7, a request for delivery of the ordered certificate, there being received the secret certificate PIN for authentication of the user B, a certificate support identification 72, a pair of cryptographic keys of the user B generated in the certificate support device 7 (depending upon the embodiment variant of the public key), as well as data making it possible to determine the order or respectively the certificate order number assigned to the order, to check these received data and to generate the desired certificate through certification of the public key, if applicable, according to conventional cryptographic algorithms, and to transmit for storage to the user B, or respectively to the certificate support device 7 identified through the certificate support identification 72, the generated certificate, or respectively a reference to the generated certificate, for instance a serial number, a directory indication or a URL address (Universal Resource Locator). The pair of cryptographic keys of the user B is generated, for example, on the certificate support device 7, according to conventional cryptographic algorithms, by means of a suitable hardware or software module, namely the key generating unit 9, and the public key belonging thereto is transmitted to the certification unit Z with the request for delivery of the certificate. In another variant, the pair of cryptographic keys of the user B is generated by means of a suitable software module of a key generating unit 9 outside the certificate support device 7, according to conventional cryptographic algorithms, which software module of the key generating unit 9 makes accessible to the certification unit Z the public key belonging thereto, and transmits the private key in a secured way, for example, to the user B, or respectively to the communication terminal 78, 8 used by the user B, or to the certificate support device 7. The private key can also be transmitted from the key generating unit 9 in a secured way to the certification unit Z, however, and from the certification unit Z, together with the generated certificate, to the user B, or respectively to the communication terminal 78, 8 used by the user B, or to the certificate support device 7.

The key generating unit 9 comprises, for example, a computer, on which the above-described software module for generating and transmitting cryptographic key pairs is implemented, or respectively with which the above-described hardware module for generating and transmitting cryptographic key pairs is connected, as well as corresponding hardware and software components to communicate via the communication network 6 and/or the communication link 5.

Figure 2A:
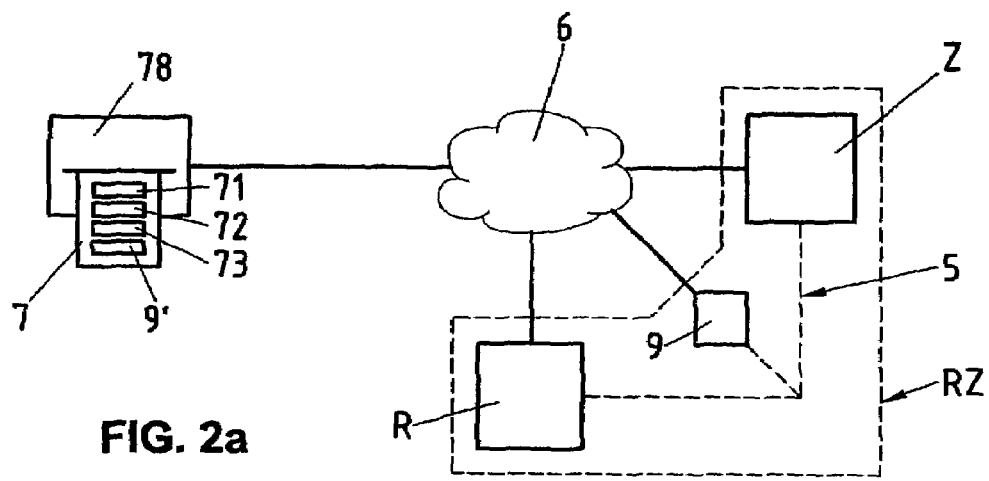
FIG. 2a shows a block diagram illustrating diagrammatically first variants of the configuration of certification unit, registration unit and certificate support device.
Figure 2B:
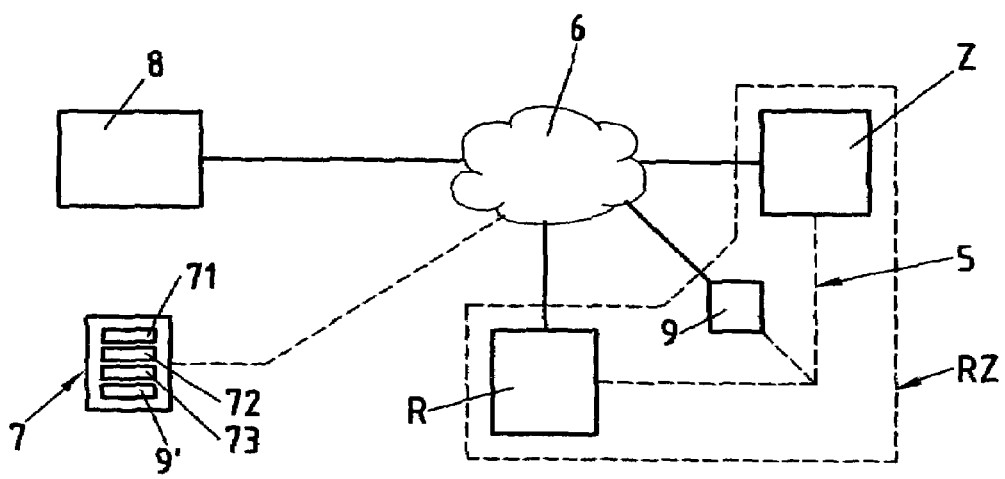
FIG. 2b shows a block diagram illustrating diagrammatically second variants of the configuration of certification unit, registration unit and certificate support device.
Figure 2C:
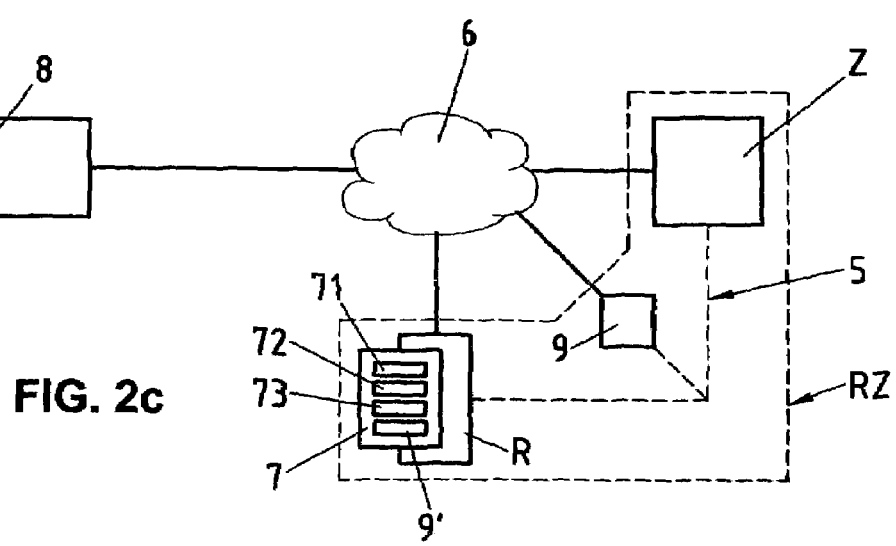
FIG. 2c shows a block diagram illustrating diagrammatically third variants of the configuration of certification unit, registration unit and certificate support device.

It should be stated here that the communication network 6 indicated diagrammatically in FIGS. 2a to 2c can comprise different types of communication networks. The communication network 6 comprises, for example, a mobile radio network, for instance a terrestrial mobile radio network e.g. a GSM or UMTS network, or a satellite-based mobile radio network, and/or one or more fixed networks, for example the public switched telephone network the worldwide Internet or a suitable LAN (Local Area Network) or WAN (Wide Area Network), for connection of correspondingly equipped communication terminals 78, 8 or of a certificate support device 7 to the registration unit R, to the certification unit Z and to the key generating unit 9. For mutual connection of the registration unit R, of the certification unit Z and of the key generating unit 9, the communication network 6 preferably comprises at least one fixed network, for instance a suitable LAN or WAN; one skilled in the art will understand, however, that mobile networks can also be used therefor.

As shown in FIGS. 2a to 2c, however, the registration unit R and/or the certification unit Z and/or the key generating unit 9 can also be linked more closely together and put together into a combined unit RZ indicated by broken lines. The registration unit R and/or the certification unit Z and/or the key generating unit 9 can thereby be implemented on a common computer or on a plurality of computers linked together, so that the units more closely linked in this way are able to communicate via the communication link 5, for example a high-speed bus or a computer-internal software interface.

The certificate support device 7 shown diagrammatically in FIGS. 2a to 2c is, for example, a personal computer, a mobile radio device, in particular a mobile radio telephone, or a chipcard, in particular a SIM card (Subscriber Identity Module) or another suitable device with data store and communications interface. To ensure that the certificate support device 7 is used only by its owner, the authorized user B of the certificate support device 7, a certificate support PIN 71 (or respectively a certificate support password) is preferably stored in a not readable memory area of the certificate support device 7, which certificate support PIN 71 (or respectively certificate support password) must coincide with a number (or respectively password) entered by the user B, in order to activate at least certain functions of the certificate support device 7. Depending upon the embodiment of the certificate support device 7, this number is entered by the user B via a user interface of the certificate support device 7 or via a user interface of a device 78, R to which the certificate support device 7 is connected. The certificate support device 7 further comprises a certificate support identification 72, for instance an unambiguous equipment number or an unambiguous user identification, e.g. an IMSI (International Mobile Subscriber Identification).

To place an order for a certificate, depending upon the embodiment of the certificate support device 7, the user uses the certificate support device 7 itself (see FIG. 2b), or he connects the certificate support device 7 to a suitable device 78, for example a communication terminal with a device interface, suitable therefor, having contacts or without contacts (see FIG. 2a), or he uses a suitable device 8 independently of the certificate support device 7, for instance a communications terminal or a suitable data input/output terminal (see FIGS. 2b and 2c). Depending upon the embodiment variant, the order can also be entered, for example, by representatives of the registration unit R at the registration unit R directly into a suitable data input/output terminal of the registration unit R.

To request and carry out the delivery of an ordered certificate from the certification unit Z, depending upon the embodiment of the certificate support device 7, the user B uses the certificate support device 7 itself (see FIG. 2b) or he connects the certificate support device 7 to a suitable device 78, for example a communication terminal with a device interface, suitable therefor, having contacts or without contacts (see FIG. 2a), or he uses, at least for the request, a suitable device 8 independently of the certificate support device 7, for example a communication terminal or a suitable data input/output terminal (see FIGS. 2b and 2c). Depending upon the embodiment variant, the request can also be entered directly into a suitable data input/output terminal of the registration unit R by representatives of the registration unit R at the registration unit R, for example, and forwarded to the certification unit Z by the respective software module which receives the request, the certificate PIN being preferably entered by the user B for reasons of confidentiality. As described above, the certification unit Z generates the ordered certificate for an authenticated user B through certification of the public key, and transmits the certificate, or a reference to the certificate, preferably in a secured way, for storing on the certificate support device 7 identified by means of the certificate support identification of the user B. The transmission of the certificate to the certificate support device 7 takes place, for example, over the communication network 6 via a device 78, into which the certificate support device 7 is inserted (see FIG. 2a), or over the communication network 6 directly to the certificate support device 7 (see FIG. 2b), or over the communication network 6 or the communication link 5 via a suitable writing device of the registration unit R, into which the certificate support device 7 is inserted (see FIG. 2c). The certificate support device 7 preferably comprises a software module, which can be started up by the user B by means of operating elements of the certificate support device 7, and which executes automatically, for example following successful entry of the certificate support PIN 71, the request, receipt and storage of the ordered certificate, or a reference to the ordered certificate, for instance with the aid of security functions, the user only needing to enter the certificate PIN 73, for instance.

Depending upon the type of devices used 7, 8 or 78 for placing the order, or respectively for the request for delivery of an ordered certificate, and depending upon the type of communication networks used 6, different known mechanisms and protocols as well as security means can be used for the communication between the devices used 7, 8, 78 and the registration unit R, or respectively the certification unit Z or the key generating unit 9, by one skilled in the art, for example symmetrical or asymmetrical encryption algorithms, and the devices 7, 8 and 78 as well as the registration unit R, the certification unit Z and the key generating unit 9 can be provided with corresponding communication and security modules. Mentioned as examples here should be the use of special short messages, for instance USSD (Unstructured Supplementary Services Data) or SMS messages (Short Message Services), or special data services, such as, for example, GPRS services (Generalized Packet Radio Service), for communication over mobile radio networks, or the communication by means of WAP-based browsers (Wireless Application Protocol), which access Internet pages over mobile radio networks, or the communication by means of conventional browsers which access Internet pages as well as conventional client/server solutions.

For transmission of an ordered certificate to the certificate support device 7 identified through the certificate support identification, depending upon the type of certificate support identification, the corresponding software or hardware module which executes this function can use the certificate support identification, for instance a MSISDN number, directly to address the certificate support device 7, or can obtain suitable address information through consultation of databases and/or directory services to address the certificate support device 7 identified by means of the certificate support identification.

The method according to the invention and the system according to the invention for carrying out this method make it possible to separate the transmission of the certificate to the certificate support device 7 of the respective user B both locally and temporally from the actual ordering by the respective user B as well as from the generation of the key pair of the user as well as from the certification, without the security being thereby limited, whereby the method for ordering, generating and delivering certificates is able to be adapted in a flexible way to differing requirements and conditions of the technical infrastructure which is available and the already existing procedures and processes. The present invention also makes possible in particular the secured transmission of certificates to, and storage of certificates on, certificate support devices 7 which have been delivered to the respective user B beforehand and are used by this user B anonymously, or the secured transmission to and storage on certificate support devices 7 which are handed over to the respective user B only after storage of the certificate.

Finally, it should be stated that the authenticated identity of a user is represented in each case by means of the secret certificate PIN.

The invention claimed is:

1. A method for ordering a digital certificate by a user and for delivering the certificate to the user, comprising:
    generating a secret certificate PIN using a certification unit,
    storing an order placed by the user and assigning the secret certificate PIN to the order,
    transmitting the secret certificate PIN, which is otherwise known only to the certification unit, from the certification unit to the user,
    transmitting the secret certificate PIN, data making it possible to determine the order and a certificate support device identification, from the user to the certification unit, and
    transmitting the digital certificate ordered by the user or a reference to the digital certificate ordered by the user from the certification unit to a certificate support device of the user, identified by the certificate support device identification, when the certification unit receives the certificate PIN,
    wherein the certificate support device enables the user to receive the digital certificate from the certification unit and be authenticated.

2. The method according to claim 1, further comprising:
    transmitting personal data of the user to the certification unit when ordering the certificate,
    authenticating the user through a registration unit, and
    confirming an assignment of the personal data to the user to the certification unit by the registration unit.

3. The method according to claim 2, further comprising:
    generating a pair of cryptographic keys, including a private key and a public key, by a key generating unit outside the certificate support device,
    making the public key accessible to the certification unit,
    generating the certificate by the certification unit through certification of the public key, and
    transmitting the private key to the certificate support device.

4. The method according to claim 1, further comprising:
    generating a pair of cryptographic keys, including a private key and a public key, in the certificate support device,
    transmitting the public key to the certification unit, and
    generating the certificate by the certification unit through certification of the public key.

5. The method according to claim 1, further comprising:
    generating a pair of cryptographic keys, including a private key and a public key, by a key generating unit outside the certificate support device,
    making the public key accessible to the certification unit,
    generating the certificate by the certification unit through certification of the public key, and
    transmitting the private key to the certificate support device.

6. A system comprising:
    means for receiving at least one order each for a digital certificate from a multiplicity of users,
    means for generating in a certification unit a secret certificate PIN for each order,
    means for transmitting from the certification unit to a respective one of users corresponding to each order the secret certificate PIN corresponding to the order which is otherwise known only to the certification unit,
    means for transmitting a certificate when the secret certificate PIN is transmitted to the certification unit,
    means for storing orders placed by the users in the certification unit and assigning to each order the secret certificate PIN generated therefor,
    means for receiving in the certification unit the secret certificate PIN, indications making it possible to determine the order, and a certificate support device identification, and
    means for transmitting a digital certificate ordered by the user or a reference to the digital certificate ordered by the user from the certification unit to a certificate support device of the user identified by the certificate support device identification,
    wherein the certificate support device enables the user to receive the digital certificate from the certification unit and be authenticated.

7. The system according to claim 6, further comprising means for receiving personal data from the respective user during ordering of a certificate and making them accessible to the certification unit, and further comprising a registration unit configured to authenticate the respective user and confirm to the certification unit an assignment of the personal data to the respective user.

8. The system according to claim 7, further comprising a key generating unit, which generates a pair of cryptographic keys, including a private key and a pubic key, and makes the public key accessible to the certification unit, the certification unit comprises means for generating the certificate through certification of the public key, and the system comprises means for transmitting the private key to the certificate support device.

9. The system according to claim 6, further comprising means for receiving from the certificate support device of a respective user a public key and for transmitting the public key to the certification unit, the public key forming together with a private key a cryptographic key pair that has been generated in the certificate support device, and the certification unit comprises means for generating the certificate through certification of the public key.

10. The system according to claim 6, further comprising a key generating unit, which generates a pair of cryptographic keys, including a private key and a pubic key, and makes the public key accessible to the certification unit, the certification unit comprises means for generating the certificate through certification of the public key, and the system comprises means for transmitting the private key to the certificate support device.

* * * * *